United States Patent [19]
Edwards

[11] 3,795,907
[45] Mar. 5, 1974

[54] RACE CALLING SYSTEM
[76] Inventor: Robert A. Edwards, 12 Notch Park Rd., Little Falls, N.J. 07424
[22] Filed: Mar. 12, 1973
[21] Appl. No.: 340,593

[52] U.S. Cl.................. 340/323, 340/23, 343/200, 343/225, 235/92 TA
[51] Int. Cl.......................... G08b 23/00, G09f 9/00
[58] Field of Search.. 340/323, 23, 408; 235/92 TA, 235/92 GA; 273/86; 343/200, 225; 325/28, 29, 64

[56] References Cited
UNITED STATES PATENTS
2,229,324  1/1941  Gordon............................. 343/200
3,546,696  12/1970  Waters............................. 340/408
3,659,261  4/1972  Tonies............................. 340/23

Primary Examiner—John W. Caldwell
Assistant Examiner—R. Lange
Attorney, Agent, or Firm—Sommers & Sommers

[57] ABSTRACT
An electronic race-calling system adapted to generate data enabling representation of the order and relative lead of race entries at call points along the race course, and at the finish line of the course. The system includes a plurality of pickup loops stationed at call points around the track, which loops co-act with transmitters carried by the several entries and operating on distinct frequencies. The received signals at a given point are furnished to a common transmission line in a random sequence, are separated, and converted to logic signal levels by individual amplifiers. The amplifier outputs are coupled to logic and memory circuits which are continuously interrogated by scan pulses to determine signal receipt. When a signal is received the channel logic produces a single output scan pulse, which is inputed to an entry encoder, which outputs codes representing the entry number. The entry encoder outputs a scan pulse on a common line whenever one is inputed to it by any channel logic circuit. Such pulse gates discrete sets of timing pulses which thereupon control the signal processing cycle. The lengths between entries are developed by measuring the time interval between each pair of consecutive entry loop crossings, using counting means. The developed information is transferred into appropriate memory circuits, which through decoders and drivers enables the information to be displayed on boards at the race track or enables the corresponding data to be transmitted to a remote utilization point.

14 Claims, 17 Drawing Figures

FIG. 1
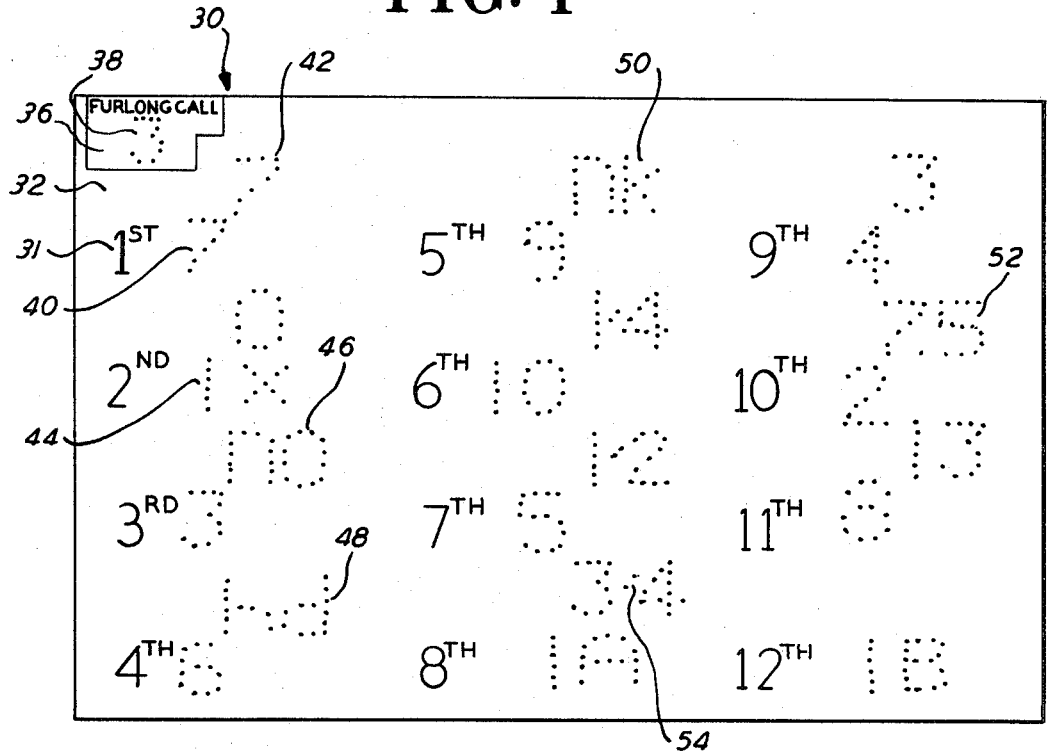
FIG. 3
FIG. 4
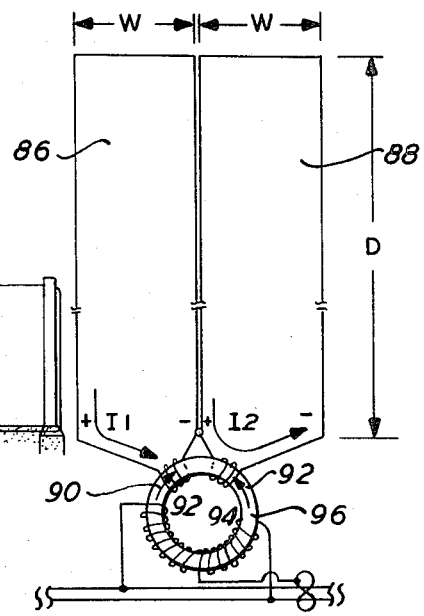
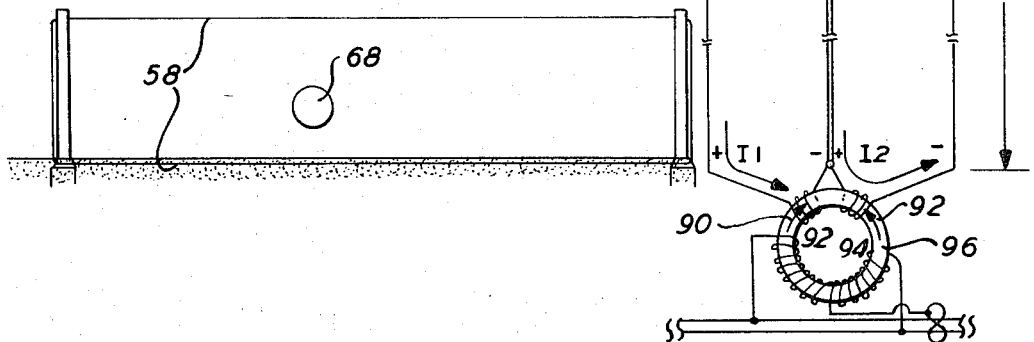

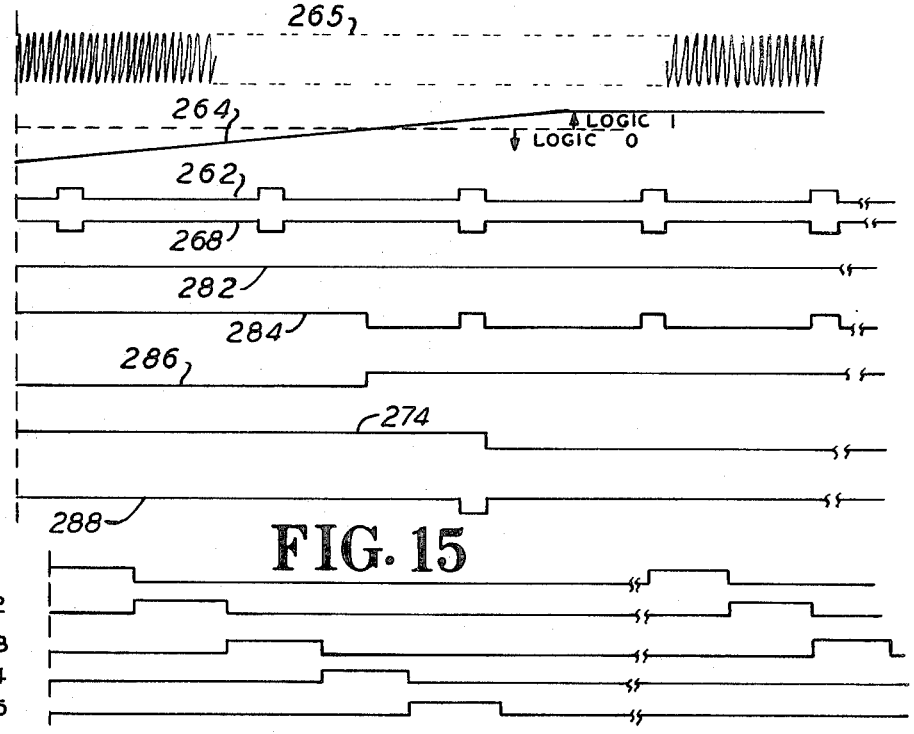
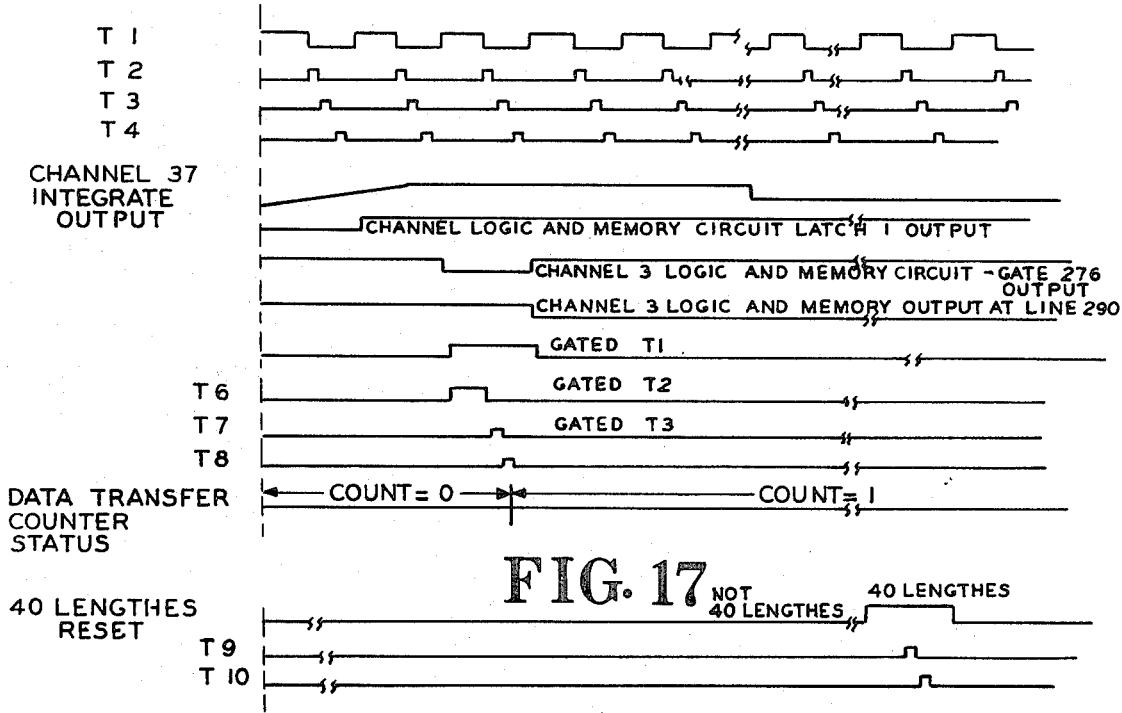

RACE CALLING SYSTEM

BACKGROUND OF INVENTION

This invention relates generally to timing and display apparatus, and more specifically relates to an electronic race calling device adapted to visually present the relative position of the several race entries, both at desired call points along the race course, and at the finish line of the said course.

Devotees of horse racing, and of similar sports wherein multiple entries race about a prescribed course, are primarily interested during the race in evaluating the relative position of the various entries. Whether such fans are actually present at the race track, watch the race on television, or are apprised of the status of the race by other means, the fans' interest, further, is not only in identifying the position in which a particular entry stands at a given point in the race, but also of knowing the length of lead that such entry may maintain with respect to the following entry. By and large, however, presently utilized methods for calling a race are inacceptable for providing these desired results. Among the most common of such methods, for example, are the simple utilization of an announcer who calls the race, making such information available to the spectators at the stand, or by broadcasting, to a remote point. An announcer, however, no matter how adept at the sport, calls too slowly to assure up-dated information, and simply cannot call lengths accurately. Furthermore, where the announcer is intended to be heard at the race track itself, the roar of a crowd tends to drown out the announcer's words, particularly in those instances of greatest interest — where the race is very close.

Similarly, direct observation of the developing race via a television broadcast, is markedly unacceptable for apprising viewers of the race status. The television broadcast simply affords the viewer too small and limited a view of the field; particularly in the stretch, such view tends to be at a poor viewing angle for enabling the observer to make an accurate judgment of entry position and lengths.

In the past it has from time to time been proposed to utilize electronic techniques for providing a read-out of a race. The problem by and large with such proposed systems has been that they were not suitable for providing a constantly up-dated status report to spectators, as the horses or other racing entities progressed about the track. In U. S. Pat. No. 2,229,324, for example, it is contemplated that a plurality of transmitters, each on a unique frequency, be secured to individual race entries, and that sensors about the race track be coupled to two transmission lines to produce timing pulses at points of call from a plurality of receivers, thereby timing the entries as they progress along the course. Individual recorders are connected to the receiver outputs, thereby providing a strip chart indication of each entry's corssing of various timing points. Such results do enable one, by suitable analysis, to evaluate the course of the race after running thereof, but do not provide information of practical and immediate value for spectators.

Similarly, it is known, as for example, in U. S. Pat. Nos. 3,546,696 and 3,588,696 to utilize transmitters associated with the individual entries in a race, and process the data provided by receivers at the race track in order to provide a readout indicative of the time of individual entires; and in some instances to process such data to provide an indication of positions of the entries. Again, in these instances, however, the systems proposed have not been found widely applicable to environments such as those of horse racing, wherein it is not only of interest to know absolute times in which an entry traverses a course, but also with relative precision to be apprised at multiple points about the track, exactly where an entry stands with relationship to the following and/or proceeding entry.

In accordance with the foregoing, it may be regarded as an object of the present invention, to provide an electronic race-calling system which presents the order of finish and lead in conventional units, such as lengths, of any entry with respect to the entry immediately following; and which further provides updated display of such relative position information in accordance with the progress of the race at desired call points along the race course.

It is a further object of the present invention to provide an electronic race-calling system which generates electronic coded data utilizable to up-date local display board information, which data may furthermore be stored or transmitted for use in publications or at remote displays.

It is another object of the present invention, to provide an electronic race-calling system, incorporating means for minimizing the effects of atmospheric noise interference with the said apparatus.

It is a yet further object of the present invention to provide a transmitter utilizable with an electronic race-calling system, which is of compact, safe and hermetically sealed design, which includes circuitry enabling accurate frequency stabilization, and which may be connected or disconnected from either a permanently mounted radiating loop, or a battery charger, without the use of electrical contacts.

SUMMARY OF INVENTION

Now in accordance with the present invention, the foregoing objects, and others as will become apparent in the course of the ensuing specification, are achieved in an electronic race-calling system which is adapted to generate data enabling presentation of the order of race entries, and of the relative lead of any entry with respect to the entry immediately following, both at desired call points along the race course and at the finish line of the course. The system includes a plurality of electromagnetic couplers stationed at points of call around the race track, which couplers co-act with transmitters carried by the several entries. The said couplers are preferably rectangular loops which couple signals received from entries through a transmission line, or via a radio link to narrow band amplifiers.

Each transmitter carried by an entry operates on a specific frequency. The carrier frequency signals transmitted by the several entries are received over the common transmission line in a random sequence. These signals are separated and converted to logic signal levels by individual channel line amplifiers. The amplifier outputs (at logic levels) are coupled to channel logic and memory circuits. The latter are continuously interrogated by scan pulses to determine if a signal was received. When a signal is received the channel logic produces a single output scan pulse. When such a single scan pulse from a channel logic circuit is inputted to an entry encoder, the latter outputs codes representing that entry number. The entry encoder outputs a scan pulse on a common line whenever one is inputted to it by any channel logic circuit. Such an output scan pulse gates discrete sets of timing pulses, which thereupon control the signal processing cycle. In particular, a period is established allowing all of the entries to pass the point of call and as an output scan signal is provided by the successive entries passing the point of call, sets of timing pulses are gated which are interpreted by the circuitry to define the entry's position in time and translate such time position to relative lag in lengths behind the preceding entry. This information is transferred into an appropriate memory circuit, which through suitable decoders and drivers enables the information to be displayed on a board at the race track, or enables the corresponding data to be transmitted to a remote point.

BRIEF DESCRIPTION OF DRAWINGS

The invention is diagrammatically illustrated by way of example in the drawings appended hereto, in which:

FIG. 1 is a diagrammatic plan view of a typical data display board, utilizable with the present invention.

FIG. 3 is a simplified elevational view of the portion of the race track, illustrating an alternate arrangement for the coupled loops of the invention.

FIG. 4 is a schematic enlarged view setting forth a dual loop construction, preferably utilizable as the coupling member for use in the present systems.

FIG. 14 is a graphical showing, setting forth a timing diagram for the channel logic and memory circuit portion of the present system.

FIG. 15 graphically illustrates the scan generator output waveforms which are applied to the gate associated with the channel logic and memory circuits.

FIG. 16 graphically illustrates the pulses provided by the timing pulse generator of the present system; and FIG. 17 is a graphical showing, depicting pulses gated in response to the 40-lengths count status, indicated on the corresponding counter forming part of the present system.

DESCRIPTION OF PREFERRED EMBODIMENT

Figure 2:
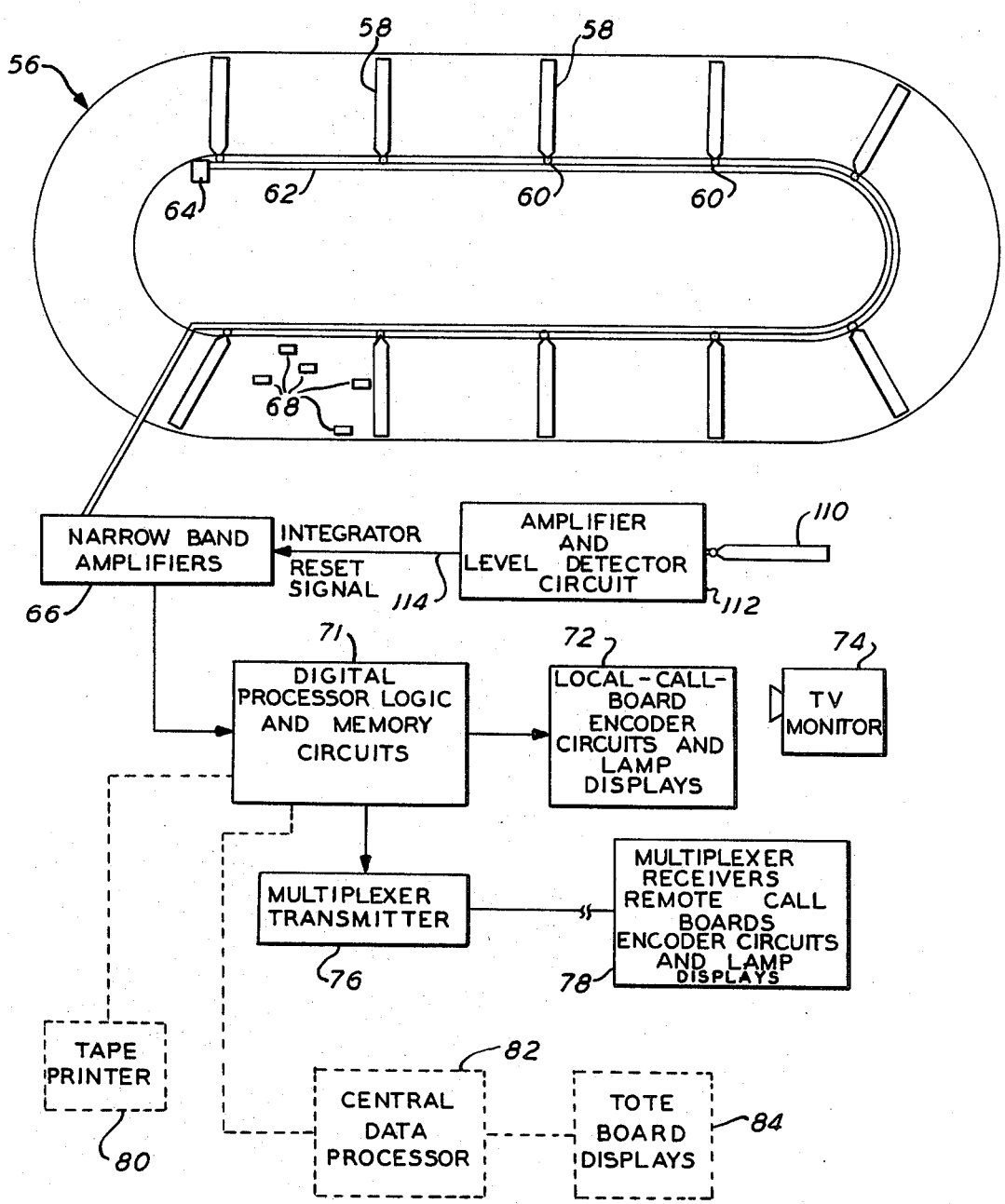
FIG. 2 is a schematic depiction of a system in accordance with the present invention installed at a typical race track operation; the principal electrical components of the system are set forth in block form.

In FIG. 1 herein, a diagrammatic plan view appears of a typical data display board 30 utilizable in accordance with the invention. The data display board set forth is with respect to its electrical characteristics, conventional, except to the extent that it is specifically adapted to display the type of data generated in accordance with the present invention. In particular it will be seen that the board 30, one or more of which may be mounted at one or more locations at a race track, includes a base 32, upon which a plurality of race positions 31 are arranged in lines and column. Adjacent each position 31 is preferably positioned a solid state dot matrix, comprising point indicators (such as LED clusters) which may be lit to indicate alphanumeric information. The matrix can, of course, comprise more conventional devices such as incandescent bulbs, etc. which are activated by conventional means to outline alpha-numerics.

In the upper left-hand corner of board 32 a section 36 is provided wherein a symbol 38 is displayed indicating the furlong call which is then displayed on the board. This indicates to the observer that the information then being displayed corresponds to the status of the race at the furlong cited. The information presented at the several matrices associated with positions 31 thus indicates e.g. that first place in the race at the indicated furlong 3 is the No. 7 entry as indicated by the information at position 40. The superscript information at postion 42 simultaneously indicates the lead in the lengths over the next or second place race position, as then shown at 44. Thus the data should be interpreted in the Figure to indicate that the first place race position is occupied by entry No. 7, who leads the second place position (occupied by entry No. 1) by seven lengths.

In accordance with the present invention, the system set forth is particularly applicable to horse racing, and for purposes of the ensuing description references will be made in that context — although the invention should, of course, not be construed as so limited. Where the system is thus employed it is seen that the superscript information 42 may indicate not only entire lengths but also as at 46 that the third place entry leads the 4th place entry by a "nose," as indicated by the designation "NO". Similarly, it is seen at 48 the designation such as "HD", indicating lead of the following entry by a "head" exists at furlong 3; or that the 5th place entry, as indicated at 50, leads the 6th place by a "neck." It is also seen that decimal values may be entered as, for example, at 52 wherein the numerical value 7.5 is seen. Similarly, a slash can be generated, as at 54, to indicate fractional values. Other designations such as "O" or "DH," for "dead heat," may also be employed.

In FIG. 2 a schematic depiction appears of a system in accordance with the invention, installed at a typical race track operation. The track is generally designated at 56, and is seen to have mounted about the race course thereof a plurality of wire loops 58, which are coupled through coupling transformers 60 to a transmission line 62 which is terminated at one end by a matching load impedence 64. The other end of line 62 feeds a plurality of narrow band amplifiers 66. Each of the amplifiers 66 is tuned to respond to a single frequency generated by a transmitter-loop assembly 68 carreid by the several entries in the race. Signal strength coupled into the transmission line 62 is a function of the mutual inductance between loops 58 and 68, which in turn depends on orientation and separation of the loops. Their mutual inductance is very small until loop 68 is near a loop 58.

Signals induced on transmission line 62, after being processed by amplifier 66, are passed to digital processor logic and memory circuits 71. The output from 71 is then provided to the local call board encoder circuits and lamp displays, as indicated at block 72. The latter may include the call board 30 referred to in FIG. 1. The board, of course, may be observed by a TV monitor as at 74, which, if desired, may be utilized to transmit information to a larger broadcast audience, or by closed channel TV to more local observers. The output from digital processor logic and memory circuits 71 may also be provided to ancillary interface equipment; for example, as suggested in FIG. 2 outputs may thus be provided to a multiplexer transmitter 76 for transmission to such points as indicated in block 78, that is to multiplexer receivers associated with remote call boards, encoder circuits and lamp displays. The output from block 71 may also be provided to a tape printer 80 providing a permanent record of the race, and similarly may be provided through a central data processor 82 to multiple tote board displays 84.

Loops 58 and 68 are preferably oriented in parallel planes, in order to maximize the mutual inductance therebetween. They may, of course, either be in horizontal planes, as illustrated in FIG. 2; or alternatively may be in vertical planes as schematically suggested in FIG. 3 herein, wherein corresponding functional loops are indicated by reference numerals as in FIG. 2. The simple loop configuration illustrated in FIG. 2 may be used, but preferably a dual loop as illustrated in FIG. 4 is employed. The function of the dual loop therein shown is to suppress the level of noise which is coupled to the transmission line due to far field electromagnetic interference, such as may be produced by lightning during thunder storms. Since the two halves 86 and 88 of the loop shown in FIG. 4 are in the same plane and of the same dimensions, voltages induced in them by a remote source are equal. The induced currents $I_1$ and $I_2$ are therefore equal; however, the loops are seen to be in opposition due to the opposition of the windings 90 and 92 upon transformer core 96. The net flux available to induce the disturbance voltage is due to the difference in induced currents $I_1$ and $I_2$, which can be minimized by equalizing the dimensions of the individual sections 86 and 88 of the dual loop and the dielectric surrounding them. The voltage induced on transmission line 62 as loop transmitter 68 moves over the dual configuration is shown in the graphical depiction of FIG. 10. It is seen that the pickup voltage builds up as loop 68 nears the first section 86 of the dual loop. When loop 68 is at the center of the dual loops the transmission line voltage nulls; then it quickly rebuilds as loop 68 passes the center of the dual loop and moves over the second section 88 thereof. A voltage is thus provided on transmission line 62 for a period approximately equal to the time loop 58 is over loop 68. This time is proportional to the speed of the entry carrying loop 68 and the width dimension of the loop 58.

Figure 9:
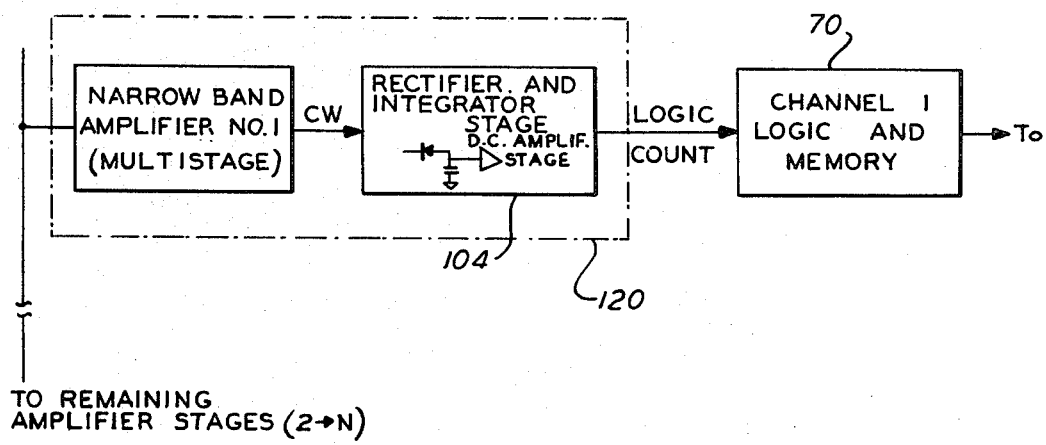
FIG. 9 is a simplified schematic diagram, setting forth certain details of the input amplifiers used in the present system.
Figure 10:
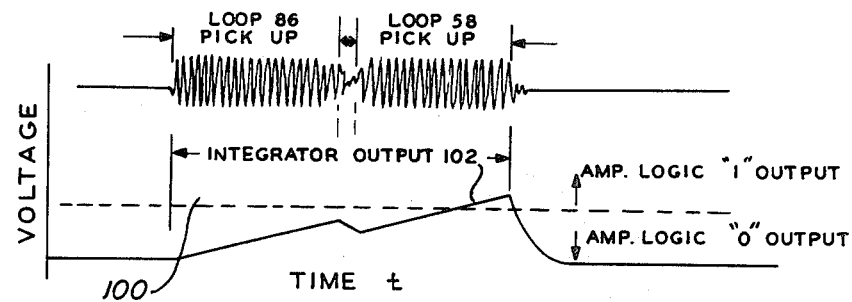
FIG. 10 is a graphical depiction setting forth the wave form of the voltage induced on the transmission line as the loop transmitter moves over the dual loop construction of FIG. 4.
Figure 11:
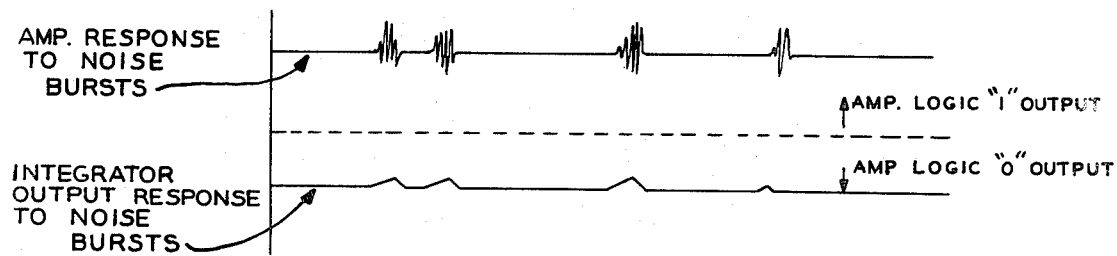
FIG. 11 is a schematic graphical representation illustrating the manner in which the rectifier-integrator network of FIG. 9, serves to further reduce the level of amplified noise bursts.

It will be further noted in FIG. 10 theat the intergrator output 100 (which portion of amplifier circuit 66 will be discussed further in connection with FIG. 9), builds up to eventually provide at point 102 an amplifier logic 1 output. By comparing FIG. 11, showing the loop 58 pickup and related integrator circuit outputs due to interference such as lightning, it is seen how noise suppression is augmented. In particular, atmospheric noise interference power spectrum ranges from a low frequency of a few kHz to approximately 10 Mhz. Amplifier output noise interference is inversely proportional to amplifier bandwidth. The use of individual narrow band channels enhances the reduction of noise pickup as well as providing separation of signals for processing purposes. Very narrow band amplifier response is achieved by using amplifier stages which are coupled through crystals (not illustrated in FIG. 9) whose series resonant frequency is equal to the frequency of oscillation of the associated oscillator circuit illustrated in FIG. 8. Secondly, by referring to FIG. 9, it is seen that each amplifier 66 includes in its output circuit a rectifier-integrator network 104, which further reduces the level of amplified noise bursts as is suggested by FIG. 11. The integration time can be nearly as long as it takes loop 68 to move over loop 58.

The present invention may also incorporate a wide band pre-amplifier and output level sensor circuit to further suppress amplifier noise. These circuits act to detect abnormally high levels of transmission voltage and uses these levels to re-set (discharge to zero) the narrow band amplifier 66 integrator output signals (FIG. 9), before they reach the logic 1 level where signal processing occurs. In the worst case this re-set feature causes the present invention to fail to call an entry; however, without such feature the presence of interference strong enough to force the integrator outputs of amplifier 66 to logic 1 would result in producing a false call. An alternate method of developing the reset signal is illustrated in FIG. 2, and consists of an auxiliary off-tract loop 110, coupled to a wide band amplifier and threshold level detector circuit 112, which produces the integrator re-set signal at line 114.

Figure 7:
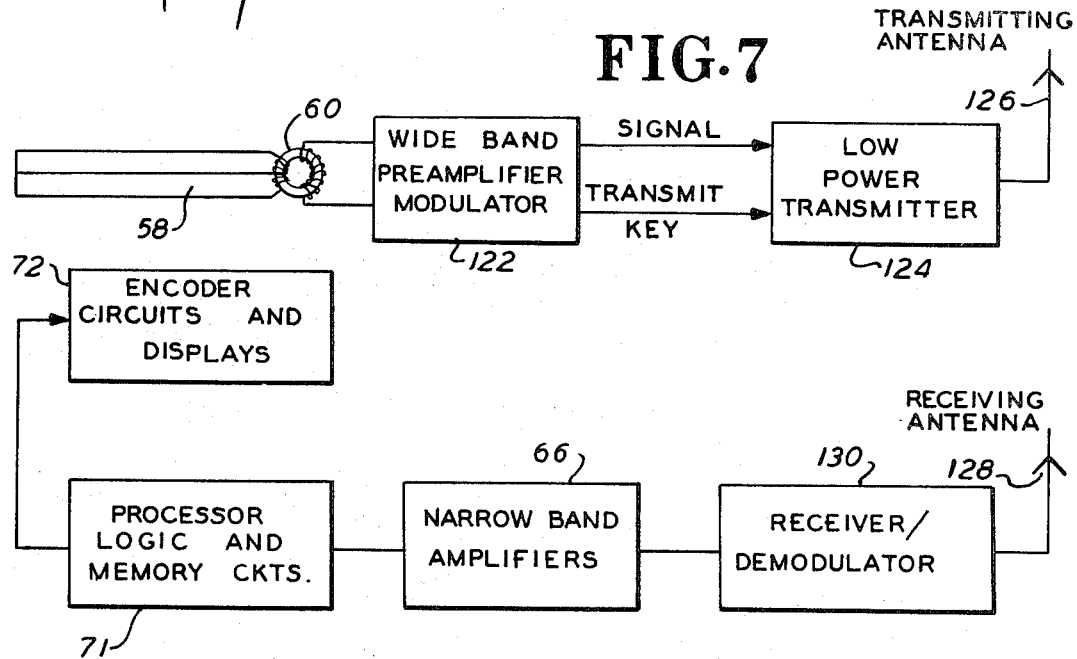
FIG. 7 is a schematic block diagram setting forth a modification of the system of FIG. 2, wherein a radio frequency link replaces the transmission line connection.

In those instances where transmission line 62 is impractical to install, an alternate method may be employed for sending signals picked-up by loop 58 to amplifiers 66. As illustrated thus in the schematic block diagram of FIG. 7, signals induced in loop 58 by loop transmitters 68 are amplified by wide-band pre-amplifier-modulator 122. This amplifier keys on and modulates low power transmitter 124, which energizes transmitting antenna 126. The modulated transmitter signal is received by receiving antenna 128 which couples the signal to receiver-demodulator 130. Demodulated output signals are in turn coupled to the input of narrow band amplifiers 66 previously referred to. Signal processing is thereafter similar to the case where transmission line coupling is employed.

Figure 5:
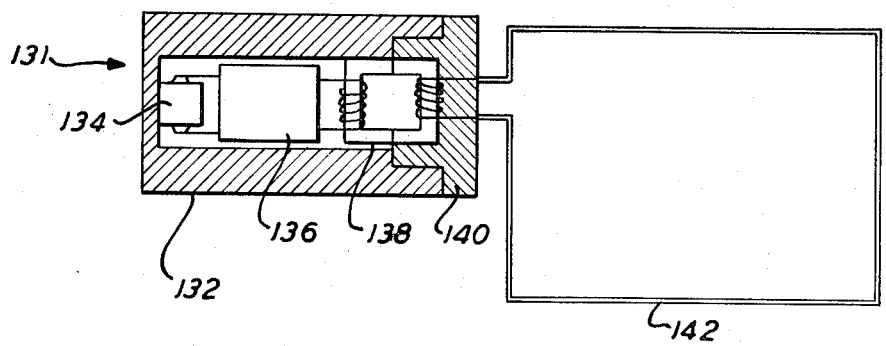
FIG. 5 is a simplified vertical section through a transmitter and loop coupler, utilizable with the present invention.
Figure 6:
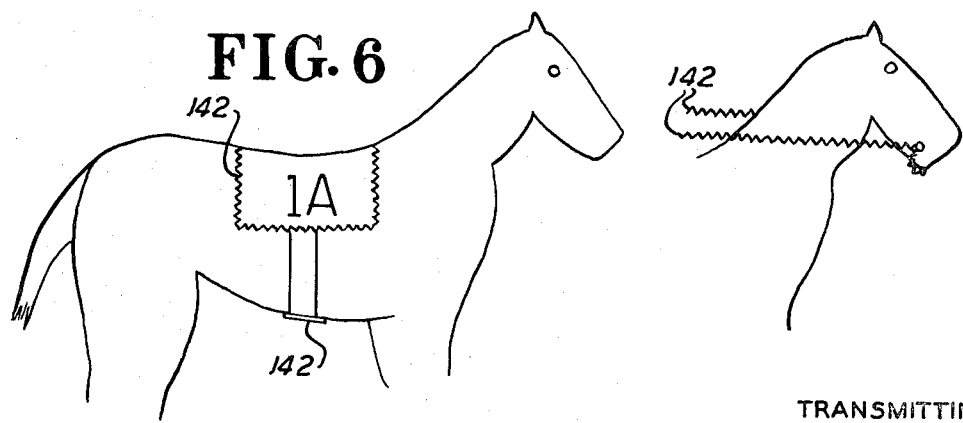
FIG. 6 is a diagrammatic view setting forth representative locations for mounting a transmitter and loop on entries measured by the present system.

A simplified cross-sectional assembly view of a transmitter 131 suitable for present purposes appears in FIG. 5. The transmitter 131 comprises an insulating enclosure 132, a rechargeable battery 134 mounted therein, a crystal oscillator and buffer amplifier 136, a matching transformer 138, an insulating cover 140, and the coupling loop 142. The matching transformer 138 can be a simple toroid or two U-shaped sections which mate when the cover 140 is attached to the enclosure. With one U-core embedded in cover 140, the enclosure assembly may be coupled or removed from the cover loop assembly without making or breaking any electrical contacts. This eliminates problems associated with contacts in the field and is tamper-proof. The cover loop assembly may be premanently installed in any of several places in entry wearing apparel. Possible locations are indicated in FIG. 6 for the case of the thoroughbred race horse.

Figure 8:
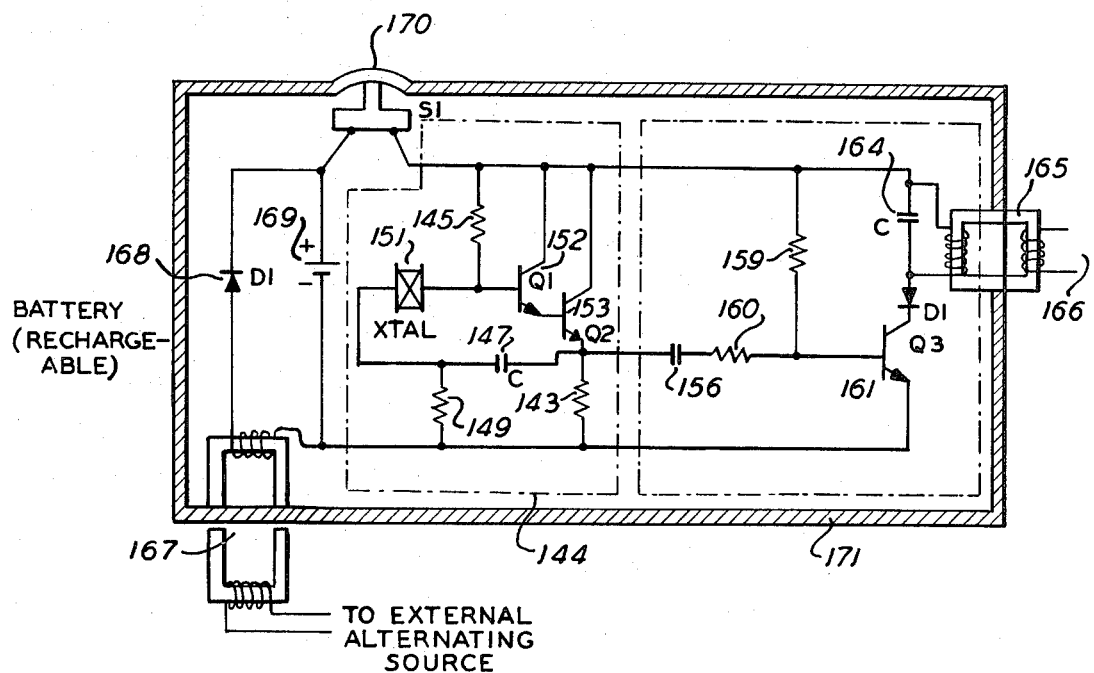
FIG. 8 is an electrical schematic diagram illustrating the essential components of a transmitter, such as that in FIG. 7.

A schematic transmitter detail circuit drawing is illustrated in FIG. 8. The circuit therein utilizes a novel crystal oscillator circuit 144 comprised of a lead phase shift network, including resistor 149 and capacitor 147, a crystal 151, and a current amplifier including transistors 152, 153 and resistors 143, 145. The circuit oscillates with high stability at battery supplied voltages as low as 2.0 volts. This circuit couples its power through a coupling capacitor 156 to a buffer amplifier comprised of resistors 159 and 160 and transistor 161, whose resonant parallel tank circuit consists of capacitor 164 and the input inductance of transformer 165 loaded by the loop 166 attached thereto. It will also be noted in FIG. 8 that the t transformer 167 and rectifier diode 168 charge battery 169 when the primary of transformer 167 is connected to an external alternating power supply. One section of U-core transformer 167 is permanently embedded in enclosure 171, while the other U-core section is mounted in a recharging fixture. A diaphragm actuated switch 170 can be used to disconnect battery power from the transmitter circuit when the battery is charging. This is an optional feature which is not required if the charging force is sufficient to charge the batter with the transmitter running.

Figure 13:
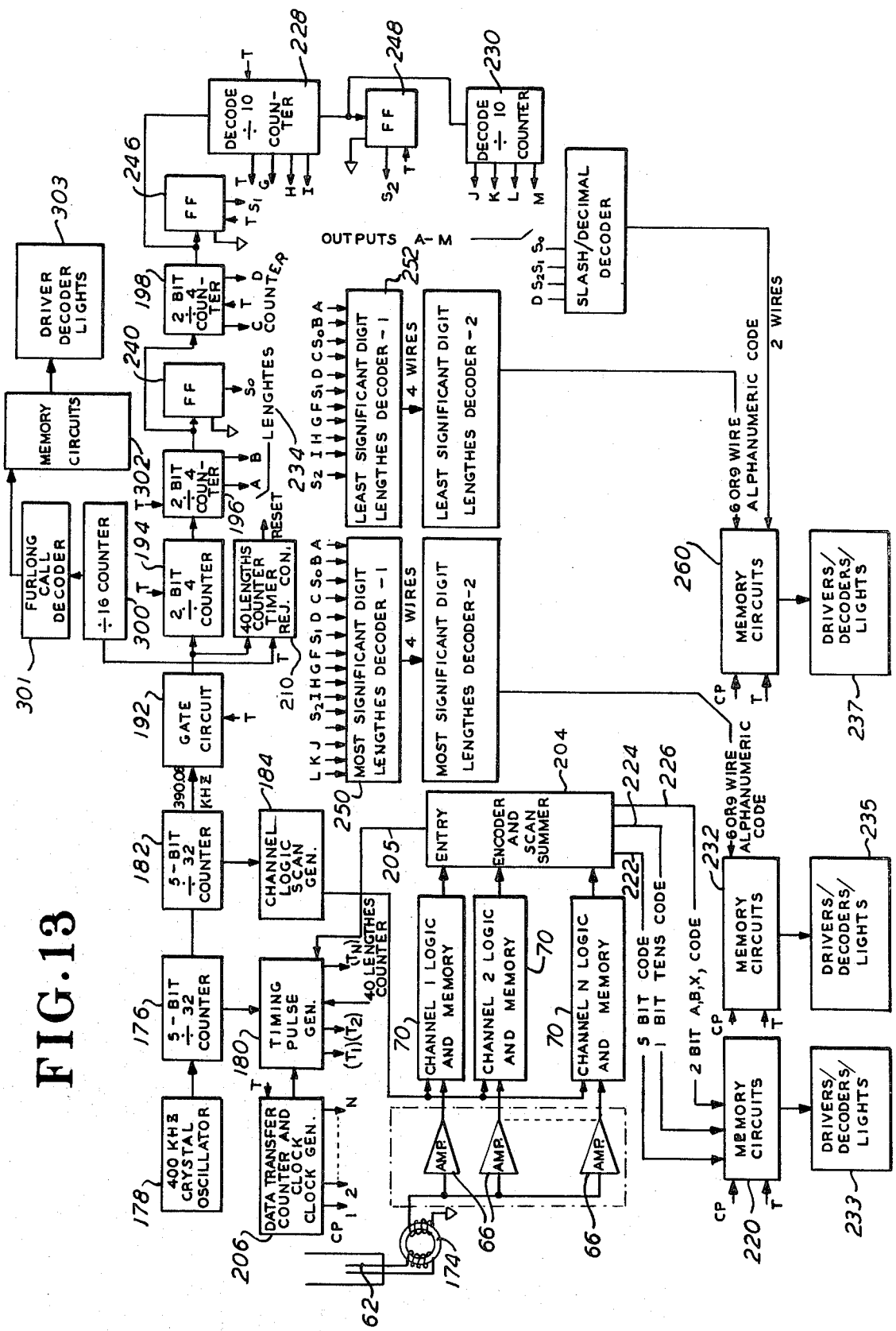
FIG. 13 is an overall electrical block diagram, setting forth the operation of the digital processor and memory circuits of the present system.

In FIG. 13 herein, an overall electrical block diagram appears, setting forth the operation of the digital processor and memory circuits of the present system. As seen in this Figure, the signals progressing via transmission line 62 are coupled through a transformer 174 to a plurality of narrow-band amplifiers 66, previously referred to, which include integrator means enabling logic level outputs. One such amplifier 66 is provided for each entry in the race and each amplifier is tuned to receive only one entry frequency. The amplifier 66 provide outputs at a logic level 0 when no transmitted signal is received, and at a logic level 1 when a transmitter signal is received. These outputs from amplifier 66 are coupled to individual channel logic and memory circuits 70, one of which is associated with each of the said amplifiers.

A 5-bit divide-by-32 binary counting circuit 176 receives a clock signal from a crystal oscillator circuit 178. The output status of this counter are inputed to a timing pulse generator 180, which produces timing pulses on individual lines $T_1$, $T_2$ etc. which recycle every 32 clock cycles. These timing pulses are further conditioned by the status of the sum (Z) output 205 of entry encoder and scan summer 204, the status of data transfer counter 206 and the status of the output of 40 lengths counter timer 210. The last stage of counter 176 which recycles every 32 clock cycles is counted by a second binary counter 182. The output status bits of counter 182 are inputed to channel logic scan generator 184 which continuously generates strobe or gate signals, which signals are applied sequentially to channel logic and memory circuits 70.

Entry signal data is received in a random timed sequence. The function of the data processing logic is to decode and store such data as it is received in a sequential manner. Referring now to the simplified logic diagram for the channel logic and memory block 70 of the present system, which diagram appears in FIG. 12, we may set forth the manner in which the desired function is accomplished. In particular, before the start of a race, the channel logic memory latch 202 and "D" flip-flop 190 circuits are initialized, that is reset; all counters such as counters 176, 182, 194, etc. in FIG. 13 are zeroed, and all data is cleared from the memory. Also gate circuit 192 is closed. The gate circuit 192 couples the divide-by-32 output of counter 182 to the input of divide-by-four counter 194. This gate is opened by a signal produced by the first entry crossing a loop 58, and is closed a fixed number of seconds thereafter. The cycle is restarted when the next loop is crossed by the leading entry.

Individual scan (strobe) pulses are continuously inputed to each channel logic and memory circuit 70, as is an amplifier output logic level on line 264. When no entry signals are received, the latch 202 and flip-flop 190 memory circuits remain reset and the applied scan (strobe) pulses produce no change in the channel logic output level. When an amplifier 66 receives entry signals, an output at logic 1 level is provided to the associated channel logic and memory circuit 70. The logic 1 amplifier level on line 264 sets latch circuit 202 when a logic 1 scan voltage level is not being applied at line 262. The set state of the latch allows the next scan pulse received to be transferred to entry encoder and scan summer circuit 204. The transferred scan pulse also clocks the channel logic "D" (edge triggered) flip-flop 190, which when clocked prevents additional scan pulses from being transferred until the data processing logic is reset after an interval of approximately 6 seconds — which has given all entries time to cross a given point of call. Entry encoder circuit 204 produces an output scan (sum) signal on line 205 whenever one is inputed to it from any of the channel logic and memory circuits 70. Each output scan (sum) signal gates one set of timing pulses produced by timing pulse generator 180. A pulse contained in a set of gated timing pulses generated by the detection of the first entry signal is nanded with the zero count status of data transfer counter 206 (FIG. 13) to control the opening of gate circuit 192, and to clear out old data from memory circuits pertaining to a previous call. Divide by 16 counter 300 (FIG. 17) is advanced one count by the opening of gate 192. The status of counter 300 is decoded by furlong call decoder 301. These codes are stored in memory circuit 302 which controls driver decoder lights 303.

The single scan pulses produced by channel logic and memory circuits 70 also enable encoder and scan summer circuit 204 to produce codes which represent entry numbers (e.g. Nos. 1 through 12) and multiple entry codes to represent A, B, X, designations which are utilized where more than one racer represents a single entry number. Each code representing an entry number is outputed by entry encoder 204 for a full scan pulse period. Each code is clocked into memory circuit 220 by the appropriate associated input lines 222, 224 and 226, by means of a second gated timing pulse. The memory element location into which each code is read is determined by the count status of data transfer counter and clock generator 206. A second gated timing pulse is nanded with data transfer counter 206 bits. The second gated timing pulse is thus gated out on an individual clock pulse (CP line) which transfers (clocks) entry codes into memory locations. The location represents the related entry's position, (1st, 2nd, 3rd, etc.) within the field of racers. These clock pulses also enter codes into memory circuits 232 and 260 representing the entry position with respect to the entry immediately following.

Figure 12:
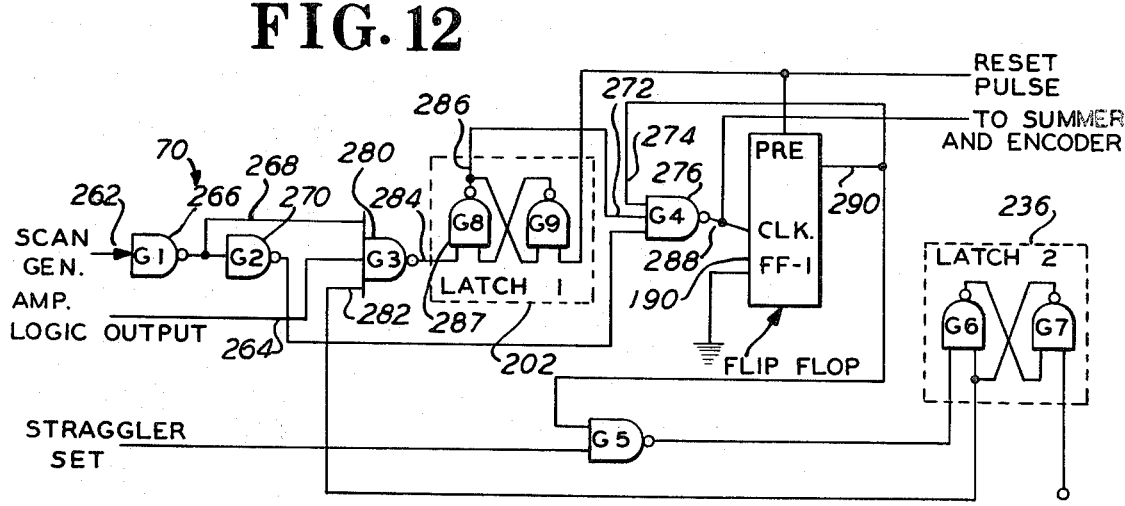
FIG. 12 is a simplified logic diagram, setting forth the principal components of the channel logic and memory block of the present system.

The latter codes are derived from principal lengths counter 234, which includes counters 196, 198, 228 and 230, and will be described in greater detail below. After entry and lengths code data is clocked into memory circuits 220 and 232, and 260, a third gated timing pulse advances data transfer counter 206, one count, and clears principal lengths counter 234 to a zero count status to enable it to count the time required by the next entry to cross the loop coupler. This time is decoded to symbolize an equivalent period in lengths. A further timing pulse in the set is ungated by the scan pulse and continuously applies a reset signal to a latch circuit which is set when the 40-lengths timer counter 210 reaches a count equivalent to 40 lengths. The counter 210 advances one count at the start of each new scan cycle. When it reaches a count of 40 lengths, it sets a latch circuit. Before counter 210 reaches such status, the latch allows the gated timing pulses to perform as described above; after the counter reaches 40 lengths, the latch enables the next set of timing pulses (ungated by a scan pulse in line 205) to clear data transfer counter 206, reset channel logic and memory circuits 70, clear principal lengths counter 234, and 40 lengths timer counter 210, set straggler latches 236 (these are seen in FIG. 12 and are latches in channel logic circuit 70 associated with entries, if any, which still have not crossed the coupler), and close gate circuit 192 to inhibit further counting. Thereafter the crossing of the next point of call by the lead entry initiates a new cycle.

Referring now in greater detail to principal lengths counter 234: when gate 192 opens, the most significant bit of counter 182 is connected to the input of the divide-by-four counter 194. The latter outputs its most significant bit to the input of principal length counter 234. The counter 194 thereof allows scan generator 184 to perform four full scan cycles before entering each new bit into counter 196. Initially, (before gate 194 is opened) counters 196, 198, 228 and 230 are reset to a zero count status and "D" flip-flop counter status latches 240, 246 and 248 are reset to a logic zero status. When gate 192 is opened and the principal lengths counter 234 is counting, the status latches indicate when the counter section connected to them overflows. The overflow status is held by these latches until the counter is cleared. Bits of the counter section and the outputs of the status latches are inputed to most significant digit lengths decoder 250 and to least significant lengths decoder 252.

The frequency utilized (97.5 Hz) to principal lengths counter 234 has a period equal to the smallest time interval to be measured, which is equivalent to one-sixteenth length, and which is represented by Nose )"NO"). Two input cycles are equivalent to one-eighth length, which is represented by a head ("HD"). Three input cycles are equivalent to three-sixteenth length, which are represented by a neck ("NK"). Four input cycles are equivalent to a one-fourth of a length, and are represented by ¼. Eight input cycles are equivalent to ½ length, and are represeted by ½. Twelve input cycles are equivalent to ¾ length and are represented by ¾. Sixteen cycles are equivalent to a full length and are represetned by 1. Similarly 24 cycles are equivalent to 1½ lengths, which is represented by 1.5. When the output $S_0$ at line 254 is at logic zero indicating the counter contains fewer than four counts, gates in decoders 250 and 252 which format codes from counter bits C through M are inhibited and gates in these decoders which format codes for O, NO, HD, NK from bits A and B are enabled by status latch levels. When counter section 196 overflows, latch output $S_0$ is set to a logic 1; then the logic 1 status of $S_0$ and logic zero status of $S_1$ (from flip-flop 246) enables gates in decoders 252 and 250 to produce codes for ¼, ½, ¾.

When counter 198 overflows the logic 1 status of $S_1$ and locig zero status of $S_2$ enable gates in decoders connected to counter bits B through I to develop codes for lengths 1, 1.5, 2, 2.5 . . . 9.5, i.e., representing separation in lengths to the nearest half-length. When counter 228 overflows the logic 1 status of $S_2$ at flip-flop 248 enables gates connected to counters 228 and 230 to transfer binary coded decimal codes for length positions 10 through 40. The status latches bracket which bits shall activate gates in decoder circuits. This process, for example, allows bits F, G, H, I to format codes for the most significant decimal in the lengths range 1 through 9.5, and to format codes for the least significant decimal in the lengths range 10 to 40. The codes produced by decoders 250 and 252 are binary coded decimals. Since 2 of 6 relay codes are used to drive relays associated with the lamp dot matrix displays of board 30, BCD to 2 of 6 code conversions are performed. These codes are clocked into memory circuit with entry data at 232 and 260. The memory circuits 220, 232 and 260 control driver decoder circuits 233, 235 and 237 which in turn control the displays as, for example, by activation of suitable relays or other conventional elements. Past performance data of lag in lengths, of each entry relative to the leading entry can simultaneously be developed by adding a second principal lengths counter. This counter would receive the same input pulses as the first principal lengths counter, but would not be cleared by each entry loop crossing. Instead it would accumulate lengths pulses until reset by the overflow status of timer counter 210.

In FIG. 14 a signal timing diagram appears depicting the operation of channel logic and memory circuits 70 of FIG. 12. As has been previously indicated, the function of circuit 70 is to output the signal pulse shown in line 288 (FIG. 14) when the entry's loop crossing is detected. This output pulse is co-incident with one of several positive input pulses, line 262, from scan generator 184. Line 264 represents an amplifier 66 integrated output voltage build-up from logic 0 to logic 1 due to the presence of a transmission line signal (line 265) caused by a loop crossing by the entry associated with this channel's logic. Line 262 thus illustrates the scan generator output wave form which is applied to the input of gate 266 (FIG. 12). Line 268 illustrates the inversion of line 262 by the inverting gate 266. Before the start of a race and each time thereafter that forth lengths counter 210 times out an interval equivalent to approximately 40 lengths from the time the lead entry makes a loop crossing, latch 202 is reset to output a logic 0 to gate input 272 and flip-flop 190 is set to output a logic 1 to the input 274 of gate 276. Latch 236 on the other hand is set to output a logic 1 to input 282 of gate 280 at the start of the race, but is not reset thereafter. This latch retains the reset status during the race providing the entry with which it is associated remains within, say 40 lengths, of the lead entry throughout the race. Otherwise, this latch 236 (previously referred to as a "straggler" latch) is set to output a logic 0 to input 282 at the conclusion of that timed 40 lengths interval. This 0 logic level is held by latch 236 for the remainder of the race to inhibit processing of signals produced by entry loop crossings. This feature of the present invention eliminates false calls due to entries which drop out in the middle of the race. Latch 236 may also be manually set to logic 0 in the event the associated entry is disqualified from winning during the race due to a lost jockey, etc.

Referring back to FIG. 14, at graph line 282 it is seen that the presence of logic 1's on the gate 280 inputs sets the output at line 284 of the said gate low, thereby forcing the latch 202 output at graph line 286 (FIG. 14) to a logic 1 state. The scan generator pulse following the output of gate 287's change of state from logic 0 to logic 1 enables an output from gate 276 in line 288 to thereby develop an inverted scan generator pulse as illustrated at graph line 288, FIG. 14. The rising edge of this pulse clocks D flip-flop 190 to set its Q output 290 to output a logic 0 level in the line 274 inputed to gate 276. This inhibits additional pulses in line 288 from being generated until flip-flop 190 and latch 202 are reset in preparation for a next loop crossing. The pulse in line 288, in addition to clocking flip-flop 190 is outputed to the entry encoder 204 where it is used to generate the unique codes associated with production of that entry's call number. The pulse inline 288 is further outputed to a sum generator that outputs a similar type pulse whenever any of several channel logic and memory circuits develop one. The sum pulse, the reset output of forty lengths counter 210, and the output status of data transfer counter 206 gate the continuous pulse trains produced by timing pulse generator 180 to produce gated timing pulses T required for signal processing. The channel logic and memory circuit 70 is designed to assure that a single, inverted, full-width, scan generator pulse is developed despite the non-synchronous timing relationship between entry crossings and scan generator wave-form timing.

The timing diagrams presented in FIGS. 15, 16 and 17 illustrate the timing relationship between pulses from channel logic and memory circuits 70, timing pulse generator 180, and channel logic scan generator 184. The square wave T1 in FIG. 16 is the divide-by-32 output of counter 176 applied to counter 182. FIG. 15 illustrates the scan generator 184 output waveforms which are applied to the inputs of the gates 266 associated with channel logic and memory circuits 70. Pulses T2, T3, T4, FIG. 16, which are produced by timing pulse generator 180 are generated continuously. By way of illustration, the channel 3 amplifier integrator output is shown in FIG. 16 rising from logic zero to logic 1 due to entry No. 3 crossing the pickup loop. The gate 276 output of the associated channel logic and memory circuit is shown being generated in time sequence with the first channel 3 scan generator pulse following the logic zero to logic 1 transition of channel 3's integrator output. Pulse T6 is a T1 pulse gated by three conditions: (a) the presence of an entry encoder sum Z output (produced in this case by a channel 3 gate 276 output); (b) a logic zero data transfer counter status (produced only if entry No. 3 is leading the field); and (c) the "not-40 lengths" status of counter 210. This T6 pulse clears the memory circuits 70 of information pertaining to the previous group crossings, and opens gate circuit 192.

Pulses T7 and T8 and T2 and T3 pulses gated by the presence of an entry encoder sum Z output at line 205, and by the "not-40 lengths" status of counter 210. The T7 pulse is used to transfer (clock) encoder data into memory. The T8 pulse is then used to advance the data transfer counter one count and to clear principle lengths counter 234. Pulse T4 is not gated and is used to reset 40-lengths counter 210 to a zero count state after this state is reached. Pulses T9 and T10 are T2, T3 pulses gated by the 40-lengths count status of counter 210, as illustrated in FIG. 17. Pulse T9 clears the principal lengths counter, applies a straggler set pulse to channel logic and memory circuits 70 which sets latch 236 (FIG. 12) providing flip-flop 190 has not been set by an entry loop crossing; clears data transfer counter 206, and closes gate 192. Pulse T10 applies a reset pulse to channel logic and memory circuit 70 which clears latch 202 (FIG. 12) and presets flip-flop 190, thereby re-initializing these circuits for the next data processing cycle.

While the present invention has been particularly set forth in terms of specific embodiment thereof, it will be understood in view of the instant disclosure, that numerous variations upon the invention are now enabled to those skilled in the art, which variations in propriety yet reside within the scope of the instant teaching. Accordingly, the invention is to be broadly construed, and limited only by the scope and spirit of the claims now appended hereto.

I claim:

1. An electronic race-calling system for displaying data indicative of a point of call and the order and relative lead of race entries at a track, comprising:
   a. a plurality of transmitters individually carried by said race entries, and providing signal outputs at frequencies distinctive to each said transmitter;
   b. first coupling means carried by each said entry for producing an output induction field at said distinct frequency;
   c. second coupling means positioned at call points at said track for receiving said signal as said first coupling means reaches the vicinity of said second coupling means;
   d. entry encoder and scan summer means responsive to said received signal and providing an encoded output representative of said associated entry and a scan sum output signals;
   e. first memory means for receiving the said encoded output of said encoder means and storing the conveyed information at a location in accordance with the position of said entry in said race;
   f. gate circuit means responsive to said scan sum output signal from said entry encoder;
   g. principal counter means for counting timing pulses during a cycle of operation initiated by opening of said gate circuit;

h. means for decoding the counter outputs of said principal counter means upon the following successive race entry coupling the signal from its transmitter to said second coupling means;
i. second memory means for storing the said decoded outputs indicative of time spacing between said two entries at a location in accordance with the position of said entry in said race;
j. means for transferring said principal counter decoded outputs to said second memory means;
k. furlong counter means for counting gate circuit openings;
l. means for decoding counter outputs of said furlong counter means;
m. third memory means for storing the said decoded outputs indicative of point of call associated with entry position and lead displays; and
n. driver and display means connected to receive the outputs from first, second and third memory means, and adapted to display the point of call and the race position of said entry, and the lead of said entry with respect to the following successive entry.

2. A system in accordance with claim 1, wherein said first, second, and third memory means are adapted to receive and store outputs associated with point of call and with successive of said entries passing said call point, and wherein said driver and display means are adapted to display the race positions of each said entry with respect to said following successive entry, and the associated point of call.

3. A system in accordance with claim 2, wherein second said coupling means comprise plural loop couplers positioned at multiple call points and connected through transformers to one balanced shielded transmission line at said track.

4. A system in accordance with claim 1, including a timing pulse generator for receiving said scan sum output signal from said entry encoder, said generator providing in response to said signal a discrete set of timing pulses controlling opening of said gate, operation of said principal counter means and transfer of said coutner means outputs to said second memory means upon such successive entry affecting a further scan sum output signal by receipt of its respective transmitter signal at said coupling means.

5. A system in accordance with claim 4, further including means for resetting said system upon passage of a period of time following opening of said gate, thereby permitting all entries of interest to have passed said call point.

6. A system in accordance with claim 5, wherein said resetting means comprises a counter activated by opening of said gate and adapted to provide a reset signal upon counting of input cycles equivalent to a predetermined number of entry lengths.

7. A system in accordance with claim 5, wherein the pulse rate input to said principal counter means is rendered such that siad decoded outputs are indicative of preselected fractions of entry lengths, whereby direct display of fractional lengths lead between said entries is enabled.

8. A system in accordance with claim 6, wherein said second coupling means comprises a dual loop pickup coil, connected to provide said signal to the processing circuits of said system which includes said entry encoder and scan summer means, through a differential transformer connection; whereby the level of spurious atmospheric noise coupled to said system is minimized.

9. A system in accordance with claim 6, including data transfer counter and clock generator means activated by an output from said timing pulse generator, for providing clock pulses to said first, second and third memory means enabling location of said stored information at said desired locations therein.

10. A system in accordance with claim 9, including a transmission line coupling said pickup coil to said processing circuits of the system.

11. A system in accordance with claim 9, further including means to detect a coupled signal above a preselected level, and means responsive to said detected level for resetting said system, whereby high level spurious atmospheric noise may reset said system.

12. A system in accordance with claim 11, wherein said detection means includes an auxiliary off-track loop for receiving said spurious atmospheric signals.

13. A system in accordance with claim 8, wherein said transmitter is a crystal control and hermetically sealed unit, coupled to a transmitting loop by transformer means having a first portion embedded in said unit, and a second portion accessible to said loop for coupling therewith.

14. A system in accordance with claim 13, wherein said receiver is a narrow band amplifier which uses crystal interstage coupling to achieve very stable narrow band response and which includes an integrator means in its output stage to further suppress the amplification of spurious amplifier input noise.

* * * * *